UNITED STATES PATENT OFFICE.

ANDREW A. DUNHAM, OF BAINBRIDGE, NEW YORK, ASSIGNOR TO CASEIN COMPANY OF AMERICA, A CORPORATION OF NEW JERSEY.

PROCESS FOR PRODUCING CASEIN PREPARATIONS.

1,080,204.          Specification of Letters Patent.          Patented Dec. 2, 1913.

No Drawing.          Application filed May 14, 1913. Serial No. 767,560.

*To all whom it may concern:*

Be it known that I, ANDREW A. DUNHAM, a citizen of the United States, residing at Bainbridge, in the county of Chenango and State of New York, have invented or discovered certain new and useful Improvements in Processes for Producing Casein Preparations, of which the following is a specification.

This invention or discovery has for its object the manufacture, in an inexpensive and simple way, of a chemical compound consisting of casein and a glycerophosphate.

The processes heretofore practised in the manufacture of a casein or albuminous substance, made by treating the albuminous substance with a glycerophosphate, are expensive and complicated, an objection which is avoided by the present invention.

In carrying the present invention into effect freshly precipitated casein, made by any of the well-known methods of adding acid to milk, is washed three or four times in water to remove as much as possible of the acid. The curd is then heated in water to about 180° F., after which the water is strained off and the curd or casein drained for about twenty-four hours. The product is now in a heavy dough-like mass, containing about 60 or 70% water, but dry enough so that it can be readily separated into fine particles, for instance by putting it through an ordinary sausage grinder. The comminuted material is now transferred to a mixer of any suitable design, and to the calculated dry weight of the casein 5% of glycerophosphate, also calculated on a dry weight basis, is added. These two substances are thoroughly mixed together in such a manner as to insure a very complete mingling thereof and the compound is then dried at a temperature of about 120° F., after which the product is ground and sifted to the desired mesh.

If it be desired to prepare a sodium glycerophosphate, the procedure is as follows: With 100 grams of anhydrous glycerin mix 125 grams of 85% phosphoric acid and heat to a temperature of about 122° F. and then nearly neutralize this mixture with sodium carbonate. It requires about 110 grams of anhydrous sodium carbonate to secure the right neutralization. It is preferable, however, to leave the product slightly acid to litmus paper.

The above mixture makes a solution of sodium glycerophosphate, of about 75% strength.

The product which is secured by treating casein with glycerophosphate in the manner above described is an edible compound, very high in protein and combining phosphates in an easily assimilable form, and at the same time a product which may easily and readily be manufactured.

The preparation produced as above described is completely soluble in water, although it reacts acid to litmus paper.

Having thus described my invention or discovery I claim and desire to secure by Letters Patent:—

1. The process of producing a casein glycerophosphate compound, soluble in water, which comprises mixing together casein in a comminuted form, containing water, with a slightly acid solution of a simple glycerophosphate, and thereafter drying the compound thus produced.

2. The process of producing a casein glycerophosphate compound, soluble in water, which comprises thoroughly mixing about 5 parts of a simple glycerophosphate in the form of a slightly acid solution thereof, with casein in amount corresponding to 100 parts of dry casein, and thereafter drying and grinding the compound thereby produced.

In testimony whereof I affix my signature, in presence of two witnesses.

ANDREW A. DUNHAM.

Witnesses:
     L. A. STEVENS,
     H. V. DUNHAM.